United States Patent [19]

Walters

[11] Patent Number: 4,843,638
[45] Date of Patent: Jun. 27, 1989

[54] RECEIVER FOR FREQUENCY HOPPED SIGNALS

[75] Inventor: Nigel J. Walters, Coolham, England

[73] Assignee: U.S. Philips Corporation, New York, N.Y.

[21] Appl. No.: 80,114

[22] Filed: Jul. 31, 1987

[30] Foreign Application Priority Data

Oct. 21, 1983 [GB] United Kingdom ............. 8328161

[51] Int. Cl.$^4$ ............ G01R 23/16; H04B 1/26; H04K 1/04
[52] U.S. Cl. ............ 455/318; 455/326; 324/77 B; 380/34
[58] Field of Search ............ 455/326, 318, 323, 326, 455/183, 59, 61; 375/88, 89, 1; 324/77 B,D; 380/34, 38; 342/20, 192, 193

[56] References Cited

U.S. PATENT DOCUMENTS 4,245,355  1/1981  Pascoe et al. .................. 455/326
4,267,600  5/1981  Campbell ..................... 324/77 B X
4,270,209  5/1981  Albanese ..................... 324/77 B X
4,385,401  5/1983  Jagnow et al. ................. 455/326

Primary Examiner—Thomas H. Tarcza
Assistant Examiner—Gilberto Barrón, Jr.
Attorney, Agent, or Firm—Marianne R. Rich

[57] ABSTRACT

A receiver for frequency hopped signal on which an information signal is modulated on one of a plurality of equally frequency spaced carrier signals. A mixer receives the frequency hopped signals on one input, and on a second input, a local oscillator signal have a comb spectrum. The local oscillator signal is generated by a short pseudo-random bit sequence generator providing the continuous comb spectrum with a frequency spacing equal to the spacing of the carrier frequency signals. A plurality of auxiliary signals are generated having a frequency spacing equal to the carrier frequency signal spacings. The auxiliary signals will have the same frequency and spacing from each other for all carrier frequency signals. The modulator means can be used to separate one of the frequency constant auxiliary signals which includes modulation produced from any one of the plurality of carrier signals.

7 Claims, 3 Drawing Sheets

Fig.4a
25·79 MHz ± 3 KHz
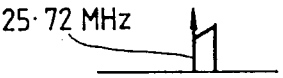
Fig.4b
Fig.4c
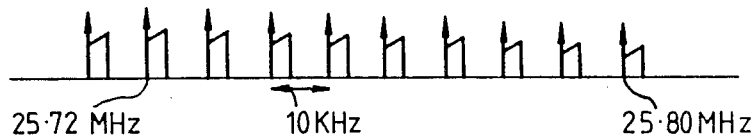
25·72 MHz    10 KHz    25·80 MHz

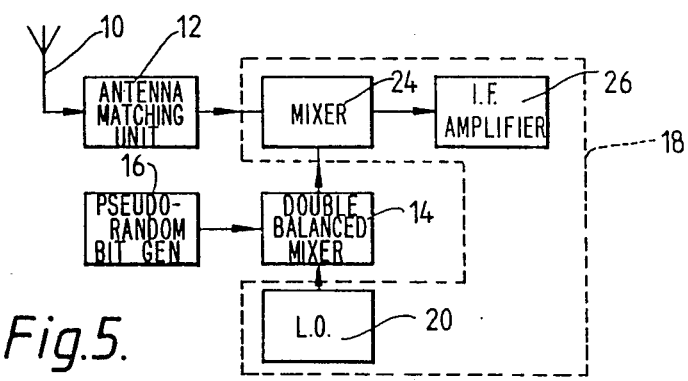
Fig.5.

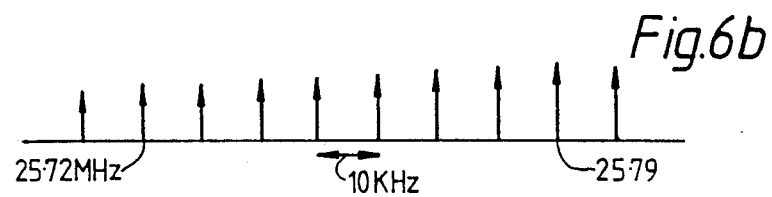
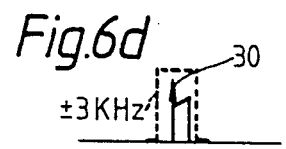

RECEIVER FOR FREQUENCY HOPPED SIGNALS

The present invention relates to a receiver for frequency hopped signals.

As is known in frequency hopped communications systems wherein a signal is switched between a plurality of channels in accordance with a desired sequence such as a pseudo-random sequence, the spacing between the available channels is substantially constant. In order for a receiver to receive correctly a transmitted signal, it must be switched between the available channels in synchronism with the switching at the transmitter. Thus not only must the sequence generators in the transmitter and in the receiver be capable of producing the same sequence, but also they must be synchronised with each other. An unauthorised person wishing to listen to a frequency hopped signal either has to learn of the sequence by carefully monitoring the transmissions or simply have a large number of receivers each tuned to a different one of the channels, and then combine the output of these receivers. In the former technique time is lost in determining what the sequence is, and if the sequence is changed than the unauthorised listener has to begin again to learn the new sequence. In the second case a large amount of equipment is required which renders the system expensive, and additionally suitably large facilities are required to store and operate the equipment. Consequently it is unsuitable for portable use and for use in mobiles.

SUMMARY OF THE INVENTION

According to the present invention there is provided a receiver for frequency-hopped signals, comprising means for converting a modulated input signal having any one of a plurality of specific equally spaced frequencies into a plurality of auxiliary signals whose frequencies are the same, one of said specific frequencies includes the input signal. They are themselves equally spaced with a spacing equal to that of said plurality of equally spaced frequencies, each of said auxiliary signals retaining the modulation of the input signal. Demodulating means includes a passband which contains only one of the auxiliary signal frequencies demodulates one of the auxiliary signals whose frequency falls within said passband.

The receiver made in accordance with the present invention is effectively able to listen simultaneously to all the channels and at the same time is simple and thereby relatively inexpensive to construct.

The means for converting an input signal into a plurality of auxiliary signals may comprise a double balanced mixer to one input of which the input signal is applied and to another input of which a signal having a comb spectrum with frequency spacing equal to the spacing of said plurality of equally spaced frequencies is applied.

Alternatively the means for converting an input signal into a plurality of auxiliary signals may comprise a local oscillator, means for multiplying the local oscillator signal by a signal having a comb spectrum, and means for mixing the output of the multiplying means with the input signal.

The signal having a comb spectrum may be provided in several ways, for example by a short pseudo-random bit sequence generator. The clock frequency of the generator and the length of the sequence are arranged so that the sequence repeats in a time equal to the reciprocal of the channel spacing e.g. every 100 microseconds in the case of a 10 kHz channel spacing and has a comb spectrum on harmonics of the channel spacing. The output of the double balanced mixer in response to every input signal is a line spectrum, with each component thereof containing the modulation of the input signal. Thus a component of the line spectrum of every signal which is a multiple of the channel spacing frequency away from the receiver frequency, is mixed into the receiver passband.

A second way of providing the desired comb spectrum of frequencies is to couple the output of the local oscillator to a double balanced mixer to which is connected a short-pseudo-random bit sequence generator whose sequence repeats at intervals corresponding to the channel spacing. The output of the double balanced mixer comprises a line spectrum which is supplied to the mixer of the receiver thus converting the antennasignal at each of the frequencies denoted by the lines in the spectrum to the intermediate frequency of the receiver. Instead of using a pseudo-random bit sequence generator one may use a series of inpulses whose pulse repetition frequency corresponds to the channel spacing, these pulses being applied to the mixer to produce a comb spectrum centred on the local oscillator frequency. Alternatively the pseudo-random bit sequence generator and double balanced mixer could be replaced by a plurality of oscillators each tuned to a different one of the frequencies in the frequency hopping system. The outputs of the oscillators are mixed simultaneously with the input signal. An advantage of using a pseudo-random bit sequence generator is that the amplitude is more or less constant and the spectrum is reasonably flat.

If it is desired to make the receiver adaptable to other frequency hopping signal systems, then the pseudo-random bit sequence generator can be made adaptable and also its clock rate can be varied.

DESCRIPTION OF THE FIGURES

The present invention will now be described, by way of example, with reference to the accompanying drawings, wherein:

FIG. 5 is a block schematic circuit diagram of a econd embodiment of the present invention, and FIG. 6 illustrates in diagrams 6A to 6D the operation of the embodiment shown in FIG. 5.

DESCRIPTION OF THE PREFERRED EMBODIMENT

Figure 1:
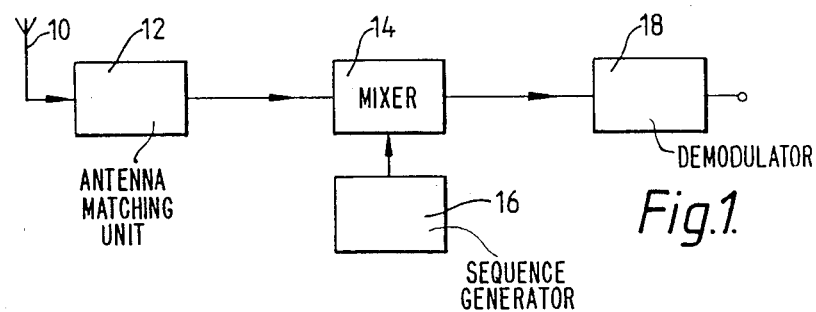
FIG. 1 is a block schematic diagram of a first embodiment of the present invention.

Referring to FIG. 1 the receiver comprises an antenna 10 which is coupled to an antenna matching unit 12, the output of which is coupled to a double balanced mixer 14. A short sequence pseudo-random bit sequence generator 16 is coupled to the double balanced mixer 14. The output of the mixer 14 is connected to a single-frequency demodulator 18 of conventional design.

In order to illustrate the operation of this embodiment of the present invention, it will be assumed that the frequency hopping system has up to forty channels with a channel spacing of 10 kHz.

Figure 2:
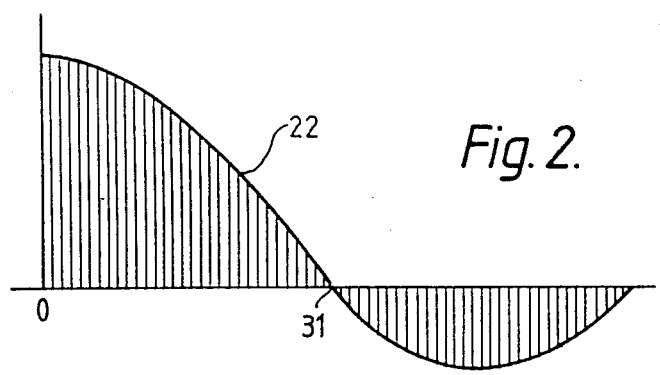
FIG. 2 illustrates a comb spectrum produced by a short pseudo-random bit sequence.

FIG. 2 is a sin x/x curve which comprises a comb spectrum on harmonics of 10 kHz. The spectrum is produced by a short pseudo-random bit sequence which in this example is 31 bits long and is clocked at a rate of 310 kHz. Consequently the sequence is repeated every 100 ∞S. A characteristic of this sin x/x curve is that 90% of its power is contained in the main lobe 22. By applying this spectrum of frequencies to the double balanced mixer 14 the incoming frequency hopped signal received at the antenna 10 is spread to a comb of signals one element of which always falls in the passband of the receiver 18.

Figure 3:
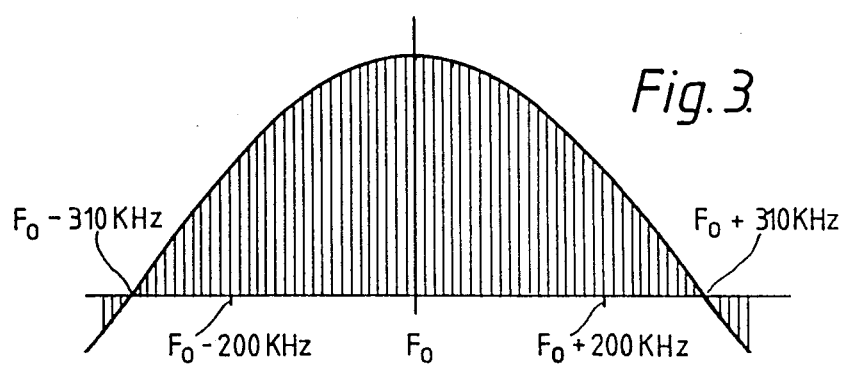
FIG. 3 shows a line spectrum formed by multiplying an antenna signal by the pseudo-random bit sequence.

FIG. 3 shows the output from the double balanced mixer 14 and comprises a centre frequency Fo which is the frequency of the received signal together with a plurality of signals at frequencies which are a multiple of 10 kHz away from the centre frequency Fo. Within 200 kHz either side of Fo the amplitudes of the signals from the mixer 14 are within 7 dB of each other. With respect to a centre frequency Fo the amplitude diminishes and approaches zero some 310 kHz away from Fo. When these signals are frequency translated in the single-frequency demodulator 18, one of them will correspond to that to which the demodulator is tuned whilst the remainder are rejected.

In use once the demodulator 18 has been adjusted to pick-up a particular channel somewhere near the centre of the frequency hopping band then it will without any further adjustment pick-up signals present in any of the other frequency hopped channels provided that they are of a known constant spacing.

Figure 4D:
FIG. 4 illustrates in diagrams 4A to 4D the operation of the embodiment shown in FIG. 1.

FIG. 4 illustrates the operation of the first embodiment of the present invention and assumes that the frequency hopped system operates on 10 kHz channel spacing and that the single-frequency demodulator 18 is tuned to 25.79 MHz with a bandwidth of 6 kHz (i.e. ±3 kHz)—diagram 4A. The currently transmitted signal which is received at the antenna 10 is at 25.72 MHz—diagram 4B. After being applied to the double balanced mixer 14, the output therefrom comprises a plurality of signals, diagram 4C, each having its own carrier frequency and an amplitude which varies relative to 25.72 MHz (Fo) as shown in FIG. 3. For the sake of clarity only a few of these signals are illustrated. However it will be noted that one of the signals is at 25.79 MHz which corresponds to the passband of the demodulator 18 and accordingly is subsequently demodulated.

FIGS. 5 and 6 show and illustrate the operation of a second embodiment of the present invention in which instead of multiplying the antenna signal, the signal from a local oscillator 20 is multiplied by the output of the short sequence pseudo-random bit sequence generator 16 in the double balanced mixer 14. The output from the mixer 14 comprises a plurality of simultaneous local oscillator signals which are frequency spaced apart by the channel spacing (10 kHz)—diagram 6B in which for convenience of reference the upstanding arrows show the local oscillator frequencies for different frequencies in the frequency hopping range, for example the reference to 25.79 relates to the local oscillator frequency to receive a signal on 25.79 MHz. These local oscillator signals together with the antenna signal, diagram 6A, are applied to a mixer 24 in the demodulator 18. The output of the mixer comprises a plurality of frequency translated signals separated from each other by the channel spacing—diagram 6C the receiver IF being referenced 30. The output of the mixer 24 is applied to an I.F. amplifier 26 which selects one of these signals—diagram 6D, and passes it onto a suitable demodulating means which may comprise a phase or frequency demodulator or SSB demodulator (not shown).

In implementing the embodiments of the present invention the pseudo-random bit sequence generator may comprise integrated circuits type 7496 and 7486. Alternatively instead of using a pseudo-random bit sequence generator one could supply a series of pulses whose pulse repetition frequency corresponds to the desired channel spacing, for example in FIG. 5 the pulses having a pulse repetition frequency of 10 kHz and pulse length around 3 μS are applied to the mixer 14 to produce a comb spectrum with lines spaced by 10 kHz.

The single-frequency demodulator 18 (which may be tunable) should have a good selectively in order to reject all those channels not selected.

In order to cope with frequency hopping systems in which the channel spacing is different then the pseudo-random bit sequence generator can be made adaptable so that its sequence length and clock rate are adjustable as desired.

I claim:

1. A receiver for frequency hopped signals in which an information signal is modulated on one of a plurality of equally frequency-spaced carrier signals, comprising:
    a short pseudo-random bit sequence generator for generating a signal having a comb spectrum with a frequency spacing equal to said equally frequency spaced carrier signals;
    a mixer for receiving on one input said frequency hopped signals, and another input for receiving said generator signal having a comb spectrum with a frequency spacing equal to said equally spaced frequency signals, whereby a plurality of auxiliary signals are generated having a frequency spacing equal to said plurality of equally spaced carrier frequency signals, and auxiliary signals having the same frequency and spacing from each other for each of said plurality of equally frequency spaced input signals; and,
    demodulating means for separating one of said auxiliary signals modulated with said information signal from the remaining auxiliary signals, whereby a signal which remains constant in frequency modulation with said information signal is provided for demodulating said information signal.

2. The receiver of claim 1 wherein said mixer is a double balanced mixer.

3. A receiver for frequency hopped signals in which an information signal is modulated on one of a plurality of equally frequency spaced carrier signals comprising:
    a local oscillator;
    a signal generator for generating a signal having a comb spectrum;
    means for multiplying a signal from said local oscillator with a signal from said signal generator;
    a mixer for mixing a signal from said means for multiplying with said carrier signals whereby a plurality of auxiliary signals are produced having the same frequencies and frequency spacing for each of said carrier signals; and
    means for filtering one of said auxiliary signals to provide an auxiliary signal for demodulating said information signal.

4. The receiver of claim 3 wherein said signal generator comprises a short pseudo-random bit sequence generator.

5. The receiver of claim 3 wherein said means for filtering has a signal passband which includes only one of said auxiliary signals.

6. The receiver of claim 5 wherein said means for filtering is an intermediate frequency signal amplifier.

7. The receiver of claim 1 or 4 wherein said pseudo-random bit sequence generator has a selectable length and clock rate for changing the frequency spacing between said auxiliary signals.

* * * * *